May 29, 1934. E. J. RIMPLE 1,960,596
HARVESTER
Filed Nov. 18, 1931 3 Sheets-Sheet 1
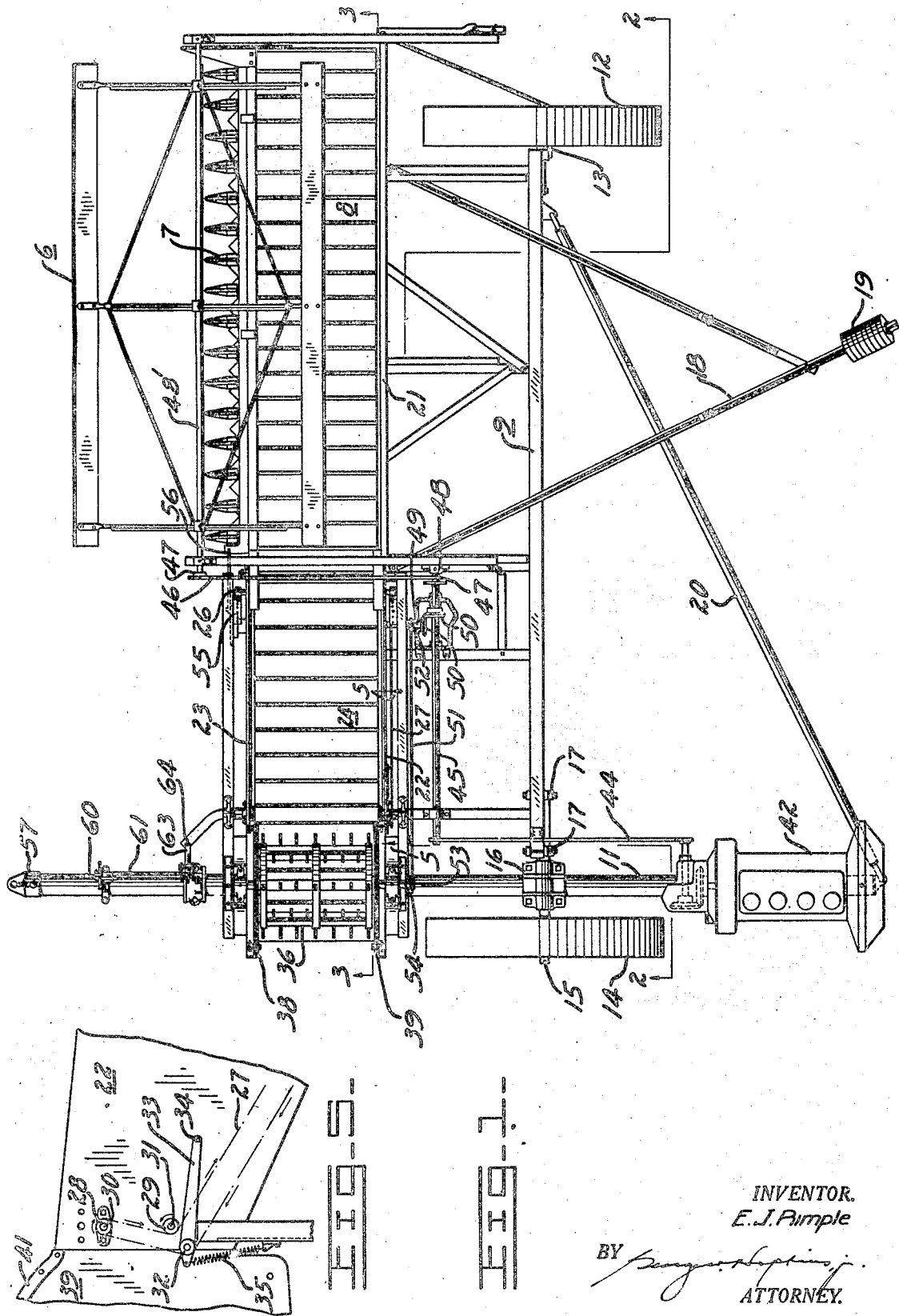
INVENTOR.
E. J. Rimple
BY
ATTORNEY.

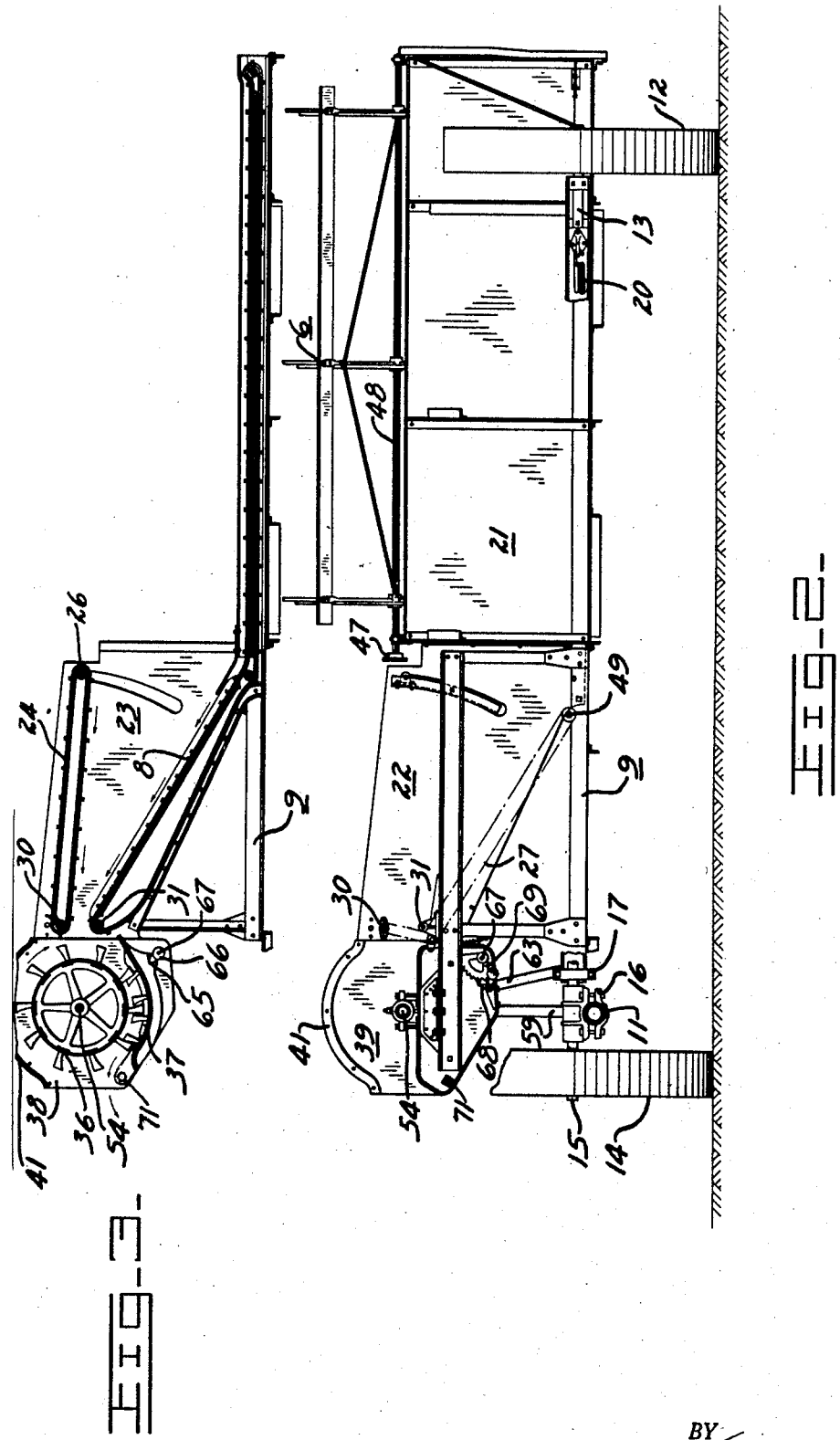

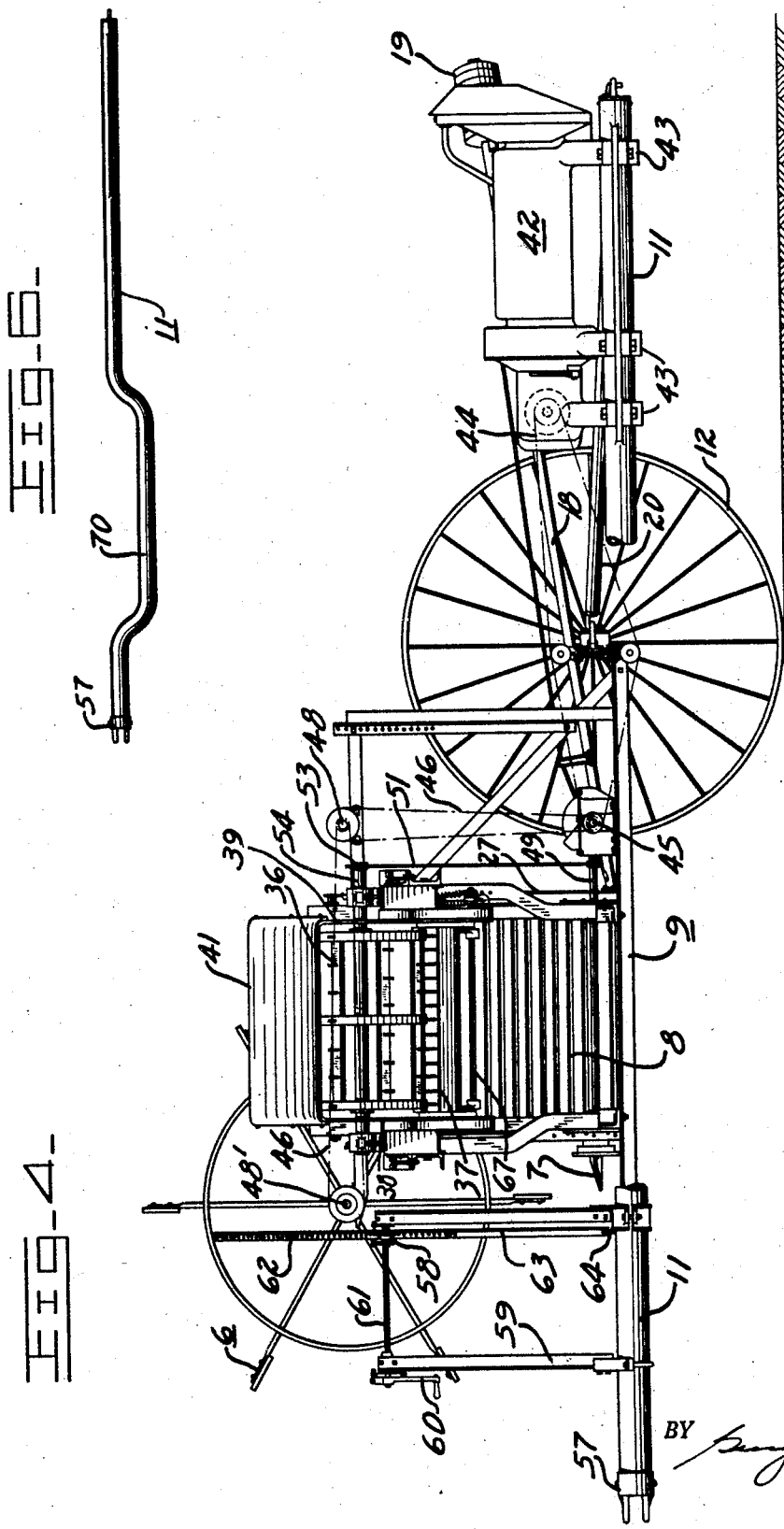

Patented May 29, 1934

1,960,596

UNITED STATES PATENT OFFICE 1,960,596

HARVESTER

Edward J. Rimple, Santa Clara, Calif., assignor to Caterpillar Tractor Co., San Leandro, Calif., a corporation of California Application November 18, 1931, Serial No. 575,795

12 Claims. (Cl. 56—23)

With some types of vegetation it is desirable that the vegetation cut from a field, instead of being carried away to be burned, or otherwise used, be returned to the field and subsequently worked into the soil. Thus, in growing asparagus, I have found it desirable that asparagus tops be cut, disintegrated, and returned to the field wherein they subsequently become incorporated into the soil to lighten and enrich the soil because of the humus and minerals added. This practice is also desirable with other vegetation to benefit the soil and increase its productivity.

It is an object of the invention to provide a method of farming and a manner of soil treatment.

Another object of the invention is to provide a machine for cutting vegetation, thereafter disintegrating the cut vegetation and returning it to the field wherein it originated.

Description of drawings

In the drawings, Fig. 1 is a plan view of my machine.

Fig. 2 is a section taken along section line 2—2 of Fig. 1.

Fig. 3 is a section of the header taken along line 3—3 of Fig. 1.

Fig. 4 is a side elevation of my machine.

Fig. 5 is a section on line 5—5 of Fig. 1.

Fig. 6 is a side elevation of a form of main frame.

Description of method and preferred form of machine

To harvest vegetation standing in a field, such as asparagus tops and the like, I provide sickle 7 (Fig. 1) to cut the vegetation and discharge it upon draper 8. Reel 6 cooperates with sickle 7.

Reel 6, sickle 7, and draper 8 (Fig. 1) are carried by frame 9 formed of structural elements such as angles and channels. Frame 9 is detachably secured to tubular main frame 11. Wheel 12 is mounted upon axle 13 on frame 9. A second wheel 14 (Figs. 1 and 2) is carried upon stub axle 15 which is secured by clamp 16 to main frame 11. Frame 9 is attached to axle 15 by clevises 17, so that the frame can be oscillated about the common axis of axles 13 and 15. Balance beams 18 (Fig. 1) extend rearwardly from frame 9 and carry adjustable weight 19 for balancing the frame and the mechanisms which it carries about its axis of oscillation. Push pole 20 maintains frame 9 in proper position relative to main frame 11.

A vertical back board 21 is provided upon framework 9 adjacent that portion of draper 8 (Figs. 1 and 2) on which cut vegetation is discharged by reel 6. The remainder of draper 8 is enclosed upon two sides by vertical side members 22 and 23.

To enable cut vegetation to be positively transported by draper 8, I position (Fig. 3) another draper 24 between side members 22 and 23. Drapers 8 and 24 converge to a point of discharge. Discharge end of draper 24 is pivoted in side members 22 and 23, while the other end of draper 24 is carried upon shaft 26 which can be raised or lowered to alter the angle of convergence. Material handled by draper 8 is engaged by draper 24 which assists its journey to the point of discharge, adjacent portions of drapers 8 and 24 moving in the same direction.

Drapers 8 and 24 (Fig. 5) are driven by passing a common drive chain 27 over sprockets 28 and 29 on shafts 30 and 31. Idler roller 32 mounted upon spring lever 33, hinged at 34 and biased by spring 35, is engaged with the chain to keep it taut. When conveying bunchy material, as asparagus tops, converging drapers 8 and 24 compress vegetation so that it is positively engaged for transporting.

Means are provided for comminuting or disintegrating cut vegetation (Fig. 3) and as such means, I employ cylinder 36 and concave 37 provided over main frame 11 adjacent point of discharge of drapers 8 and 24. Material discharged from drapers 8 and 24 is discharged and is forced between cylinder 36 and concave 37 to be disintegrated. Other means for disintegrating, cutting, or shredding the vegetation can be employed if a different degree of disintegration or a different form of cut vegetation is desired.

Concave 37 (Figs. 3 and 4) is provided between plates 38 and 39 provided as extensions of members 22 and 23. A shroud or hood 41 is provided over cylinder 36 and is adapted to direct the discharge out onto the field. Cylinder 36 and concave 37 not only disintegrate vegetation, but also serve as means for spreading vegetation uniformly over the field, thereby simplifying the machine.

To supply power (Fig. 4) for operation of the several units of the machine, I fasten engine 42 upon main frame 11 by clamps 43. Engine 42 is disposed on main frame 11 so that its weight substantially balances that weight forward of axles 13 and 15, thereby simplifying construction. Engine 42 (Fig. 1) delivers power through chain 44 to countershaft 45 from which reel 6 is driven by chains 46 passed over sprockets 47 on shaft 45, stub shaft 48, and reel shaft 48¹. Drapers 8 and 24 are driven by passing chain 27 over a sprocket on shaft 49 driven from shaft 45 by gears 50. Cylinder 36 is also driven from shaft 49 by chain 51 passed over sprocket 52 on shaft 49 and sprocket 53 on cylinder shaft 54. Sickle 7 is reciprocated for cutting vegetation by cam 55 on shaft 49 and pitman 56 extending to sickle 7.

Main frame 11 carries draft attachment 57 (Figs. 1 and 4) so the machine can be attached to a vehicle as a tractor to be advanced over a field wherein the vegetation can be cut, disintegrated, and spread uniformly over the field.

The position of sickle 7 (Fig. 4) relative to the field is adjusted by pinion 58, mounted on shaft 61 for rotation in subframe 59 by crank 60. Pinion 58 engages rack 62 on vertical member 63. Hinged member 64 connects member 63 to frame 9. Vertical movement of rack 62, upon rotation of pinion 58 by crank 60, raises or lowers frame 9, relative to the field, by rotational movement of frame 9 about common axis of axle 15 and axle 13.

With power delivered by engine 42 to move reel 6, sickle 7, drapers 8 and 24, and cylinder 36, and with the machine drawn over a field on which vegetation as asparagus tops are standing, the vegetation will be cut and thereafter shredded and disintegrated. The finely divided material will then be discharged uniformly from the cylinder onto the field to be plowed under or left to rot on the field and then plowed under. The vegetation rots and disintegrates, returning valuable minerals to the soil and furnishing humus to lighten the soil.

The position of concave 37 relative to cylinder 36 (Figs. 2 and 3) can be varied to control the disintegration of material. Concave 37 is hinged at one end by bolts 71 in plates 38 and 39. Concave 37 includes, at the other end, recesses 65 engaged by levers 66 on shaft 67. Shaft 67 is carried in plates 38 and 39. Rotation of shaft 67 is effective to move levers 66 to vary the position of concave 37 relative to cylinder 36. Shaft 67 is held against rotation by pawl 68 and ratchet 69 carried by shaft 67.

While the relation between main frame 11 and the various mechanisms (Figs. 2 and 4) permits of adjustment to cut asparagus as usually grown upon hills, it is sometimes desirable to lower sickle 7 practically to that ground level upon which wheels 12 and 14 travel. This cannot be done with the frame shown, as plate 38 will engage main frame 11. However, main frame 11 (Fig. 6) can be readily provided with a depressed portion 70 to receive plates 38 and 39 and permit sickle 7 to cut at ground level.

I, therefore, claim as my invention:

1. In a machine of the class described, a main frame extending in the direction of advance of the machine and having a ground-engaging member thereon, a header frame detachably secured to said main frame and having a draper extending transversely with respect to the main frame, a ground-engaging member on the header frame, means for mounting the header frame for adjustment with respect to the main frame and about a substantially horizontal axis, and a material disintegrating device mounted on the header frame at the discharge end of the draper to receive material from the draper, said device being adjustable together with the header frame and being adapted to discharge all the material directly onto a field.

2. In a machine of the class described, a header extending transversely with respect to the direction of advance of the machine and having a conveyor for transporting material transversely with respect to said direction, a main frame for supporting the header and extending forwardly and rearwardly transversely of the header, and a material disintegrating device mounted above the main frame to receive material from the conveyor and to discharge all of said material onto a field.

3. In a machine of the class described, a header extending transversely with respect to the direction of advance of the machine and having a conveyor for transporting material transversely with respect to said direction, a main frame for supporting the header and extending forwardly and rearwardly transversely of the header, means for mounting the header for adjustment independent of the main frame, and a material disintegrating device mounted on the header at the discharge end of said conveyor to discharge material onto a field.

4. In a machine of the class described, a header extending transversely with respect to the direction of advance of the machine and having a conveyor for transporting material transversely with respect to said direction, a main frame for supporting the header and extending forwardly and rearwardly transversely of the header, means for mounting the header for adjustment independent of the main frame, and a material disintegrating device mounted on the header at the discharge end of said conveyor to discharge material onto a field, said device being positioned over the main frame and being adapted to discharge all the material fed thereto directly onto the field.

5. In a machine of the class described, a header unit, a main supporting body unit therefor extending forwardly and rearwardly transversely of the header unit, said header unit having a conveyor for transporting material transversely with respect to the main supporting body unit, and a disintegrating device positioned to receive material from the conveyor and to discharge the material onto a field.

6. In a machine of the class described, a header unit, a main supporting body unit therefor extending forwardly and rearwardly transversely of the header unit, said header unit having a conveyor for transporting material transversely with respect to the main supporting body unit, and a disintegrating device positioned to receive material from the conveyor and to discharge all the material fed thereto directly onto a field.

7. In a machine of the class described, a conveyor extending transversely with respect to the direction of advance of the machine positioned to receive material from a field and to transport material in a direction transversely with respect to said direction of advance, and a disintegrating mechanism to receive material from the conveyor, said disintegrating mechanism being closely adjacent the side of the machine to discharge material directly onto the field.

8. In a machine of the class described, a conveyor extending transversely with respect to the direction of advance of the machine positioned to receive material from a field and to transport material in a direction transversely with respect to said direction of advance, and a disintegrating mechanism to receive material from the conveyor, said disintegrating mechanism being directly at the side of the machine to discharge all the material fed thereto directly onto the field.

9. In a machine of the class described, a conveyor extending transversely with respect to the direction of advance of the machine positioned to receive material from a field and to transport material in a direction transversely with respect to said direction of advance, a disintegrating mechanism to receive material from the conveyor, said disintegrating mechanism being directly at the side of the machine to discharge all the material fed thereto directly onto the field, and means for mounting the disintegrating mechanism and the conveyor for simultaneous adjustment about a substantially horizontal axis.

10. In a machine of the class described, a conveyor extending transversely with respect to the direction of advance of the machine positioned to receive material from a field and to transport material in a direction transversely with respect to said direction of advance, and a disintegrating mechanism to receive material from the conveyor, said disintegrating mechanism being positioned to discharge all the material fed thereto directly onto the field.

11. In a harvesting machine, a material disintegrating device, an endless conveyor for transporting material to said device, a second endless conveyor spaced from the first conveyor and positioned thereabove to engage material on the first conveyor, and means for mounting one of said conveyors for adjustment with respect to the other of said conveyors.

12. In a harvesting machine, a cylinder and concave unit, an endless conveyor for discharging material into said unit, a second endless conveyor spaced from the first conveyor and positioned thereabove to engage material on the first conveyor, means for pivotally mounting the second conveyor at the end adjacent said unit, and means for mounting the opposite end of said second conveyor for adjustment about said pivot.

EDWARD J. RIMPLE.